May 22, 1951 P. J. MATHIEU 2,554,372
BELT TRANSMISSION DRIVEN ON A GROOVED PULLEY
Filed Dec. 22, 1945 2 Sheets-Sheet 1

INVENTOR
PIERRE JULES MATHIEU
BY
ATTORNEYS

May 22, 1951 P. J. MATHIEU 2,554,372
BELT TRANSMISSION DRIVEN ON A GROOVED PULLEY
Filed Dec. 22, 1945 2 Sheets-Sheet 2
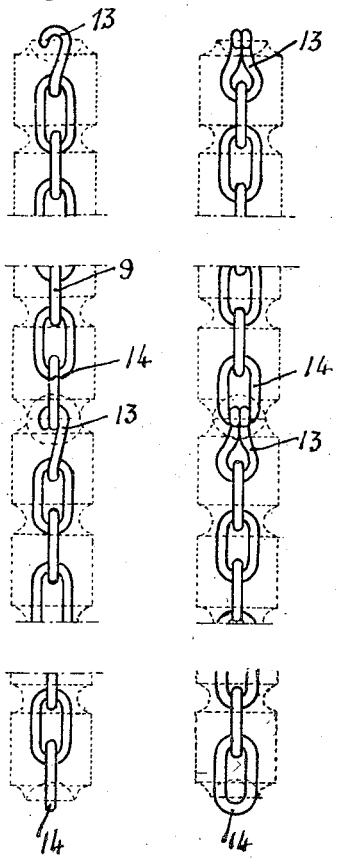
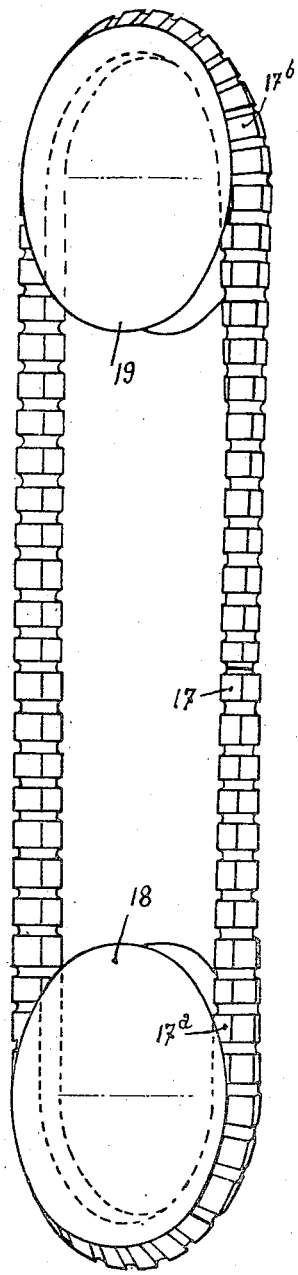
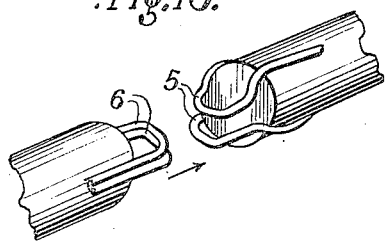
INVENTOR
PIERRE JULES MATHIEU
BY
*Rackenbach & Hirschman*
ATTORNEYS Patented May 22, 1951

2,554,372

UNITED STATES PATENT OFFICE 2,554,372

BELT TRANSMISSION DRIVEN ON A GROOVED PULLEY

Pierre Jules Mathieu, Rambouillet, France

Application December 22, 1945, Serial No. 637,015
In France April 6, 1945

2 Claims. (Cl. 74—237)

The V-shaped belts are used more and more where a power has to be transmitted and they are aiming to replace the flat belt.

The V-shaped belts present, in fact, a number of advantages, especially the following: possibility to drive from one pulley to another using an intermediate weak axis, thus reducing the occupied space; good adherence, thus permitting a high gear-ratio; reducing the initial tension, thus diminishing the reaction on the pulleys; a silent running.

There are however some disadvantages, for instance: especially, the cross section of the belt is distorted and the angle of the flanks (V-faces) varies according to the radius of curvature for the reason that the angle forming the groove of the pulleys has to vary too much if it is wanted to secure a long life of the belt; moreover the manufacture of endless chains gives difficulties on engaging and disengaging the ends, because on replacing one belt by another new one, the length of the belt has to remain exactly the same.

The present invention relates to a belt transmission running in a grooved pulley which has all the advantages of a V-shaped pulley without having its disadvantages and showing besides other additional advantages.

The belt of this invention is characteristic in that respect that its exterior surface is discontinuous, i. e. it consists of a succession of full elements from rubber or other plastic material, which are adapted to be applied against the grooves of the pulleys and which are separated from each other by elements which do not contact the grooves of the pulleys. In the interior of the mass of the belt is embedded a core which has for its object to transmit the pull and which consists of a cable or of an aggregate of cables or of a metallic chain.

Figure 1:
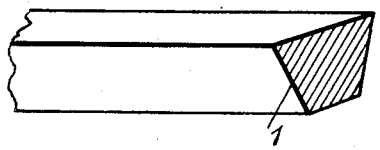
Figure 2:
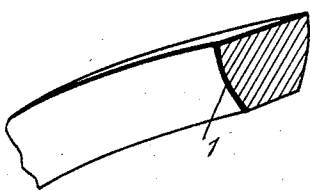

The invention is represented by way of example in the accompanying drawing in which:

The Figures 1 and 2 are the perspective views of an ordinary V-shaped belt of a known type.

The Figures 3 to 8 are the elevation views, respectively of the front and of the side of the three forms of execution of a belt according to the invention.

Figure 9:

The Figure 9 is an elevation view of one of the forms of the execution of a core.

Figure 10:
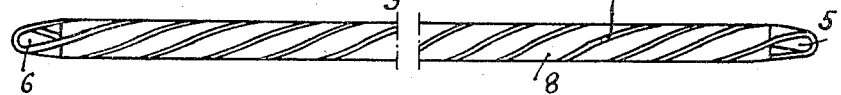

The Figure 10 is a view in plan corresponding to Figure 9.

The Figures 11, 12, 13 and 14 are the elevation views of the three forms of execution of the core connection being in this case a chain.

The Figure 15 is a perspective view showing according to the invention the pulley with its belt having a section of a regular pentagon.

Figure 16 is a perspective view of the ends of a belt, said ends being twisted ⅕ of a turn.

By putting an ordinary belt (Figs. 1 and 2) on the pulleys, its outside peripherial part will be stretched, while the part resting in the grooves will be compressed. Between these parts is located the neutral fibre. This stretching and compression results in a distortion of the section: when the belt is straight, Fig. 1, its side faces are also straight, if the belt is curved then its side faces are also curved, Fig. 2. These stretchings and compressions when repeated with a higher rhythm results in an evolution of heat warming up the belt which becomes fatigued and tends to disintegrate.

On the contrary in the belt with a discontinuous surface according to the invention, there are neither stretchings nor compressions. The core alone carries the work of deformation. The distortion which is produced in the ordinary belt is here considerably reduced.

Since the section of the belt is not distorted, the pulleys may be formed with the same angle whatever their diameter may be. The belt does not become hot and shows a great flexibility which is not comparable with that of ordinary belts. It can be applied in a perfect manner on pulleys even of a small diameter. The adherence to the pulleys is much better than with belts of a continuous surface. The difference is comparable with the difference of the adherence to a slippery ground of a good ribbed new automobile tire in comparison with a used polished one. Another result of the increase of the adherence consists in that, that the belt can be put on the pulleys without tension and a higher reduction of the gear-ratio can be adopted. It is possible to transmit with the belt a much greater power without it sliding, thus saving the belt and simplifying the installation.

The discontinuity of the external surface embodied in a form which is totally included in the scope of the invention and represents its most simple case is shown by way of example in the accompanying drawings. According to this, the full shaped parts, 2, of the belt are separated from each other by a ring shaped groove 3, spaced in such a form that the belt shows flexible qualities as indicated above.

Figure 7:
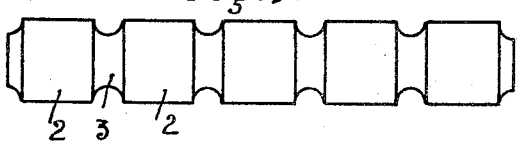

The full shaped section 2 can have a trapezium form (Fig. 3 and Fig. 4), a form of a regular pentagon (Fig. 5 and Fig. 6), being more generally of a polygon form, a circular form (Figs. 7 and 8). In case of a pentagon, the angle of two non-consecutive sides is 36°.

As the section is not distorted by passing over the pulleys, the angle formed by the side flanks of the grooves for the trapezoidal belt and circular belt has its admissible minimum in order that the belt is not pinched in the grooves, for the pentagonal belt this angle is 36°.

By adopting for all the pulleys an angle of 36° and by making the belt of a trapezoidal form with an angle of 36°, it is possible to turn over all the pulleys with these excellent properties any other belt of this invention independent of its forms.

The belts of this invention instead of being manufactured in a form of an endless belt as used now for ordinary belts, can be made from elements of standard or other convenient lengths; the connection of these elements to an aggregate, which will be described below is simple and does not imperil the flexibility of said aggregate.

For instance if a type of a belt is considered which utilizes a distance of 1 meter and more it is sufficient to make elements being respectively 35 cm., 40 cm. and 50 cm. long, so that the combination of these elements when taken in a proper amount permits to suit any length of a belt being a multiple of 5 cm. The manufacture of elements of 40 cm. and 50 cm. is sufficient to make belts of all lengths being multiple of 10 cm. For a manufacturer, it is a great advantage to make standard lengths of elements instead of elements of various sizes. The manufacturers will be in advantage if all the belts of not standard sizes will be abolished (i. e. not multiple of 5 cm.). The customer has also his advantages being in the possibility to obtain a replace for his belt in a shortest time. The owner of big plants who carry large quantities of various belts for its own use are gaining considerably storing now only standard elements for replacement.

The inside core consists of a cable or chain. In case of a chain, in each groove 3 is located a joint-connection, which makes the discontinuity of the outside surface. In case of pentagonal and circular belts, which are of symmetrical section, the core is arranged along the axis of the belt. In all the cases, the core is terminated on each extreme end of the element of the belt with a hook-organ which permits the junction of the element's ends together.

The Figures 9 and 10 represent a cable-core in a form of a spiral 7 on a rubber core 8 terminating at one end with a loop 5 and at the other end with a double loop 6. The loop 5 reenters into the double loop 6 of the adjacent elements and the junction is made by means of an axis, rivet, peg and the like.

Figure 11:
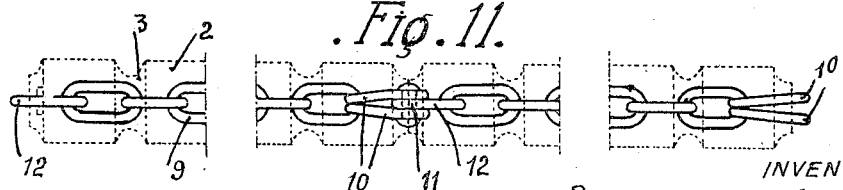

The Figure 11 represents an armature with a chain 9; the junction is made here in a similar way, the chain carries on one of its ends a double chain-link 10; an axis, 11, connects a simple chain-link 12 of one of the elements to a double chain-link, 10, of the adjacent element.

The Figures 12 and 13 show a chain 9 ending at one of its ends with a hook 13, which goes into the chain-loop end 14 of the adjacent element. In the modification shown in Fig. 14, the chain terminates at one of its ends with a double loop 15 and at the other end with a double hook 16.

The various forms of linkage and the like can be also applied to cables.

Figure 4:
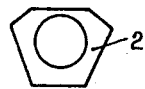
Figure 3:
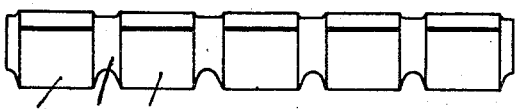
Figure 6:
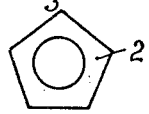
Figure 5:
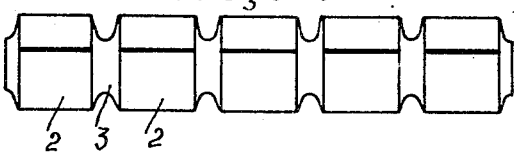
Figure 8:
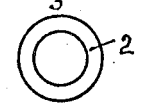

The putting the belt on the pulleys according to the invention is carried out in the same way as with an ordinary belt, especially if it concerns the trapezoidal belt shown in Figs. 3 and 4. However according to the features of the invention, the pentagonal (Figs. 5 and 6) or polygonal and the circular belt (Figs. 7 and 8) can be put on the pulley in a special manner.

If between any two of the elements of a belt of pentagonal section the linkage is twisted ⅕ of a turn, or 72°, the continuity of the faces is maintained, because the pentagonal section is regular. When mounted upon pulleys, and in operation, as indicated in Fig. 15, the result of the partial twist in linkage is that the belt rotates on its axis. Thus all faces of each element of the belt are uniformly subjected to wear.

Figure 16 is a perspective view of the ends of a belt, the core of which has been twisted ⅕ of a turn; the ends being the same as that of Fig. 9. The one end of a single loop 5, and the other end comprises two parallel superimposed loops 6, the plane of which has been twisted relatively to that of the single loop 5 of ⅕ of a turn, or 72°, corresponding to the center angle of a regular pentagon. After having been engaged, the single loop 5 and the double loop 6 are united by means of a pin or rivet or the like.

Now in case of an ordinary V-shaped belt always the same two faces are being used, while in the belt of a regular pentagonal section its five faces are being used uniformly; the life of this belt is therefore 2.5 times higher. Summarizing it can be said that when the belt moves over the pulleys, it turns at the same time around itself; it is clear that its core must be axial.

The same phenomenon is taking place with a circular belt. When exerting a pulling effort on the cable with a spiral type of strand, a torsion couple is created which tends to turn one end relative to the other around the axis in the direction which tends to enlarge the pitch of the spiral. The torsion couple is higher the higher the pulling effort.

The result is that, that in a belt with a circular cable-core, the pulling effort in the stressed fibres produces a rotation of the belt around itself. In the non-stressed fibre a rotation in a reverse direction is produced, but these two rotations do not compensate each other and the belt takes a rotation movement of its own.

This rotation produces itself automatically and not by a manipulation as in the case with the pentagonal belts.

With circular belts having a chain-core, the rotation starts at the moment when putting on the belt on the pulleys, i. e. at the moment when connecting the two extreme ends of the belt, by giving a torsion of one half turn or of one full turn to one of the extremities relative to the other. In this manner, the belt is used up uniformly around its total periphery.

The core can be made adherent by one or other known means with a mass of rubber or other plastic material. The aggregate forms then a single piece and it is impossible to separate the armature without destroying the material.

The elements of the belt of this invention can be very well manufactured by serial-methods requiring only little machinery and little labour.

I claim:

1. A transmission belt comprising a series of spaced blocks each of regular pentagonal section and of resilient material separated by spacers of lesser section, a core imbedded within said blocks and spacers to resist tensile stress, and, at the ends of said core, means for linking said ends each to the other so that the belt is twisted that part of a full turn equal to the reciprocal of the number of sides of the pentagonal section of such blocks.

2. A transmission belt comprising a series of spaced blocks each of regular polygonal section and of resilient material separated by spacers of lesser section, a core imbedded within said blocks to resist tensile stress, and, at the ends of said core, means for linking said ends each to the other so that the belt is twisted that part of a full turn equal to the reciprocal of the number of sides of the polygonal section of such blocks.

PIERRE JULES MATHIEU.

REFERENCES CITED

The following references are of record in the file of this patent:

UNITED STATES PATENTS

| Number | Name | Date |
|---|---|---|
| 171,505 | Clark | Dec. 28, 1875 |
| 377,484 | Gandy | Feb. 7, 1888 |
| 1,792,921 | Newhouse | Feb. 17, 1931 |
| 1,796,875 | Radt | Mar. 17, 1931 |
| 1,980,437 | Reeves | Nov. 13, 1934 |
| 2,061,838 | Johns | Nov. 24, 1936 |
| 2,240,735 | Yelm et al. | May 6, 1941 |

FOREIGN PATENTS

| Number | Country | Date |
|---|---|---|
| 107,805 | Great Britain | July 11, 1917 |
| 119,792 | Switzerland | Apr. 16, 1927 |
| 585,309 | Germany | Oct. 2, 1933 |